United States Patent [19]

Ogawa

[11] Patent Number: 4,522,165
[45] Date of Patent: Jun. 11, 1985

[54] NOISE REDUCING COVER FOR AN INTERNAL COMBUSTION ENGINE

[75] Inventor: Naoki Ogawa, Yokohama, Japan

[73] Assignee: Nissan Motor Company, Limited, Yokohama, Japan

[21] Appl. No.: 516,982

[22] Filed: Jul. 25, 1983

Related U.S. Application Data

[63] Continuation-in-part of Ser. No. 155,237, Jun. 2, 1980, abandoned.

[30] Foreign Application Priority Data

Jun. 2, 1979 [JP] Japan .................. 54-68214
Jun. 2, 1979 [JP] Japan .................. 54-68215
Jun. 23, 1979 [JP] Japan .................. 54-85445[U]
Jun. 23, 1979 [JP] Japan .................. 54-85446[U]

[51] Int. Cl.³ .............................................. F02F 7/00
[52] U.S. Cl. .......................... 123/195 C; 123/198 E; 181/204
[58] Field of Search ............ 123/195 C, 198 E, 90.37, 123/90.38; 181/204, 294

[56] References Cited

U.S. PATENT DOCUMENTS 4,048,366 9/1977 Kingsbury .................. 123/198 E

FOREIGN PATENT DOCUMENTS 2735153 2/1979 Fed. Rep. of Germany ...... 181/204
1307868 2/1973 United Kingdom .
1306807 2/1973 United Kingdom .
1400447 7/1975 United Kingdom .
1516150 6/1978 United Kingdom .

*Primary Examiner*—E. Rollins Cross
*Attorney, Agent, or Firm*—Schwartz, Jeffery, Schwaab, Mack, Blumenthal & Evans

[57] ABSTRACT

A noise reducing cover for use with an internal combustion engine, taking the form of a cylinder head cover, an oil pan, a valley cover, a valve lifter cover or the like, is constructed of a main body portion of a resilient porous material, and an inner skin layer of a resilient non-porous material, securely connected to the inside of the main body portion. The noise reducing cover excludes a hard layer made of metal or hard plastic, thereby suppressing vibration of the noise reducing cover itself even when engine vibration is transmitted thereto.

23 Claims, 17 Drawing Figures

1/3 OCTAVE-BAND CENTER FREQUENCY Hz

NOISE REDUCING COVER FOR AN INTERNAL COMBUSTION ENGINE

RELATED APPLICATION

This application is a continuation-in-part-application of applicant's pending U.S. patent application Ser. No. 155,237, filed on June 2, 1980, now abandoned.

BACKGROUND OF THE INVENTION

1. Field of the Invention

The present invention relates generally to a noise reducing cover for moving parts of an internal combustion engine, as in a cylinder head cover, oil pan or the like, and more specifically to a noise reducing cover for moving parts of an internal combustion engine comprising a plurality of layers of vibration and sound absorbing material for reducing the noise of the internal combustion engine moving parts.

2. Description of the Prior Art

Covers for moving parts of internal combustion engines, as in cylinder head covers (valve covers), oil pans, valley covers, valve lifter covers, and the like have traditionally been formed from sheet metal. Solid sheet metal is hardly a vibration or sound absorbing material; in fact, solid metal is one of the best sound and vibration conductors known to man. When a cylinder head cover or the like is rigidly mount to an internal combustion engine, which of course, it must be in order to perform its intended function, the cover itself becomes an excellent conductor of noise and vibration produced by the internal combustion engine. In fact, due to the shape of certain types of such covers having large, essentially flat sections, these covers become excellent amplifiers of engine noise. Additionally, engine vibration is transmitted to the particular cover, thus creating another source of noise-the vibration of the cover itself.

SUMMARY OF THE INVENTION

The noise reducing cover of the present invention is constructed of a main body portion of a first vibration and noise absorbing porous material, and an inner layer formed of a second vibration and sound absorbing material, securely connected to the inner side of the main body portion to form a composite of the first and second vibration and noise absorbing materials. The inner layer is adapted to be directly connected to the surface of the engine and impervious to liquids used in the engine. Additionally, the composite of the first and second vibration and sound absorbing materials is adapted to be soft or resilient enough to effectively absorb vibration and noise but rigid enough to maintain a required shape of the noise reducing cover. It is to be noted that the noise reducing cover of the present invention excludes any hard layer made of a material such as hard plastic or metal. Therefore, the noise reducing cover is prevented from vibrating even when engine vibration is transmitted thereto, effectively absorbing engine noise generated under the noise reducing cover. Thus, the noise reducing cover of the present invention effectively suppresses noise radiation therefrom, thereby reducing overall noise from the engine.

DESCRIPTION OF THE DRAWINGS

The features and advantages of the noise reducing cover of the present invention will be more clearly appreciated from the following description taken in conjunction with the accompanying drawings in which like reference numerals designate corresponding elements, and in which.

DETAILED DESCRIPTION OF THE INVENTION

Figure 1:
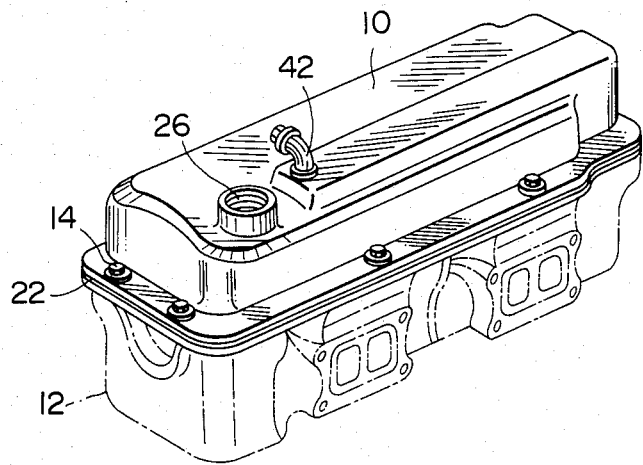
FIG. 1 is a pictorial view of the external configuration of a typical cylinder head cover, either conventional or a cover according to the present invention.

Turning now to the drawings, and more specifically FIG. 1, a typical configuration of the noise reducing cover of the present invention for use as a cylinder head cover is shown, generally illustrated by the numeral 10, mounted on a conventional engine cylinder head 12 (shown in phantom) by a plurality of mounting bolts 14. Also shown is a mounting gasket 22, commonly disposed between the cylinder head cover 10 and the engine cylinder head 12 to provide an oil-tight seal therebetween. The cylinder head cover of the present invention includes a structural reinforced access opening 26 and a second, alternative access member 42.

Figure 2:
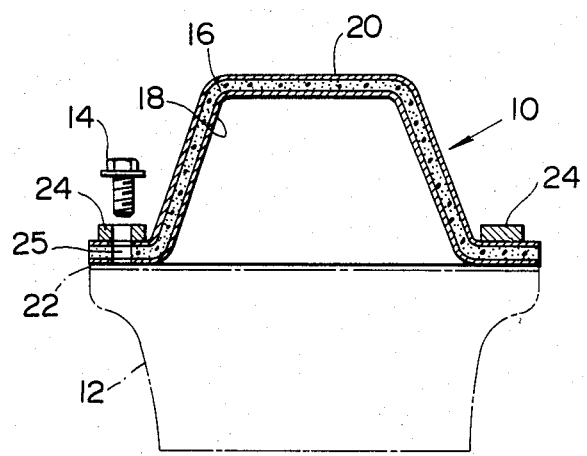
FIG. 2 is a vertical sectional view of the noise reducing cover of the present invention having an outside configuration similar to that of FIG. 1.

FIG. 2 shows the construction of an embodiment of the noise reducing cover of the present invention to include a main body portion 16 formed of a first vibration and sound absorbing material. In the embodiment, this first material comprises a foam polyurethane containing a thermosetting resin. This main body portion 16 may be formed in any conventional manner. The noise reducing cover 10 includes a first inside layer 18 of a second vibration and sound absorbing material. In the embodiment, this second material is a thin sheet of a fiberglass material, thermo-pressure adhered to the main body portion 16 so that the thermosetting resin of the body portion is impregnated into the first inside fiberglass layer.

The embodiment also includes a second outside layer 20 of a second vibration and sound absorbing material adhered to the outer surface of the main body portion 16 in a like manner, preferably simultaneously therewith to form a structurally rigid vibration and sound absorbing cover.

The noise reducing cover of the present invention also includes a plurality of mounting structural reinforcement sections 24, constructed of conventional plastic or metal. These structural reinforcement members 24 are permanently bonded to the noise reducing cover 10 at the location of mounting holes 25 to evenly distribute the force of the mounting bolts 14 over a larger area of the noise reducing cover 10 in order to reduce the possibility of fatigue failure of the cover construction of the present invention, and to more evenly distribute such force along a larger sealing contact area between the cover 10 and the engine cylinder head 12.

Figure 3:
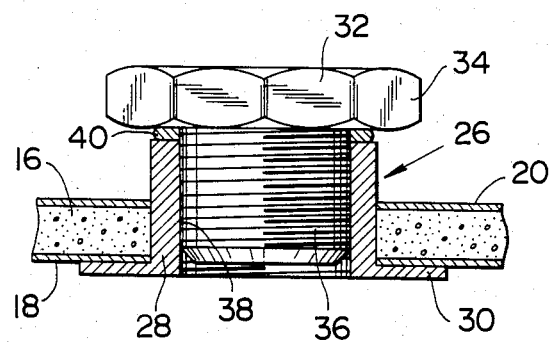
FIG. 3 is a vertical sectional view of one embodiment of a structural reinforced access opening for use with the noise reducing cover of the present invention.

The noise reducing cover 10 of the present invention includes a structural reinforced access opening 26, shown in FIG. 3. This structural reinforced access opening 26 includes an access opening body portion 28 having an annular flange portion 30. This reinforced access opening body portion 28 may be constructed of metal or plastic, similar to that of the mounting structural reinforcement 24, and is installed in an opening within the noise reducing cover 10 by a press-fit, chemical adhesion, or both to form an oil-tight seal therebetween.

An access opening plug 32, also shown in FIG. 3, is provided for use with the structural reinforced access opening 26. The plug 32 comprises a plug head 34 and a threaded shaft 36 for engaging female threads 38 of the reinforced access opening. Also included is an annular seal or gasket 40 for providing an oil tight seal between the access opening plug head 34 and the mating surface of the access opening body portion 28.

Figure 4:
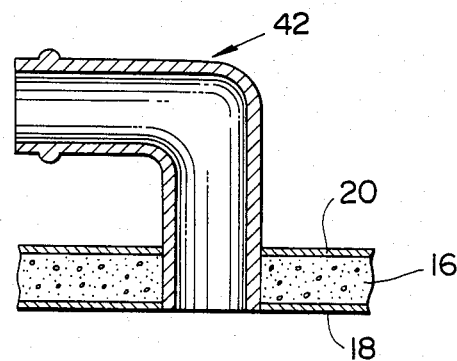
FIG. 4 is a vertical sectional view of an alternative access member for use with the noise reducing cover of the present invention.

An alternative access member 42 is shown in FIG. 4. This particular embodiment comprises a metal member and serves as a blow-by connector to permit pressure equalization within the cylinder head cover, and also to permit recirculation of unburned fuel and oil fumes. As in the structural reinforced access opening 26 of FIG. 3, the alternative access member 42 is installed into the noise reducing cover 10 by a press-fit, chemical adhesion or both.

Figure 5:
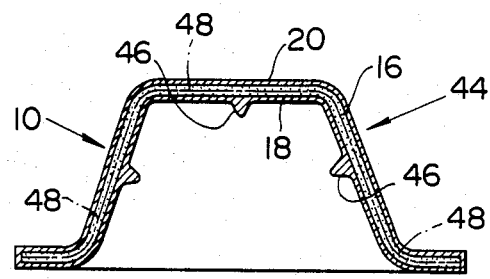
FIG. 5 is a vertical sectional view similar to FIG. 2 showing an alternative embodiment of the noise reducing cover of the present invention.

FIG. 5 shows an alternative embodiment 44 of the construction of the noise reducing cover 10 of the present invention. This alternative embodiment 44 includes a plurality of structural reinforcing ridges 46 formed of the same second vibration and sound absorbing material of the first inside layer 18 of the cover. As shown, the structural reinforcing ridges 46 are formed into a parabolic shape at the time the first inside layer 18 is bonded to the main body portion 16. Of course, any shape of reinforcing ridge 46 may be employed, as long as it is suitable to perform the intended function of structurally reinforcing the noise reducing cover 10. Although shown only in cross section in FIG. 5, the structural reinforcing ridges 46 run the entire length of the respective sidewall portions of the cover 10. In fact, it should be apparent to those skilled in the art that in an enclosure such as the one used herein for explanation purposes, the structural reinforcing ridges 46 on the sidewall portions of the noise reducing cover 10 actually form a single reinforcing ridge which extends along the entire length of each of the sidewall portions thereof. Obviously, also a plurality of the structural reinforcing ridges 46 may be employed to define a checkerboard or matrix pattern, as desired, to increase the structural rigidity of the noise reducing cover.

The alternative embodiment shown in FIG. 5 also includes a structural reinforcing mesh material 48 formed within, and as part of, the main body portion 16. This mesh material 48 may be constructed of any suitable material (such as metal, plastic or glass fiber) capable of effecting a permanent bond with the first material of the main body portion 16 and imparting a structural rigidity to the noise reducing cover 10.

Figure 6:
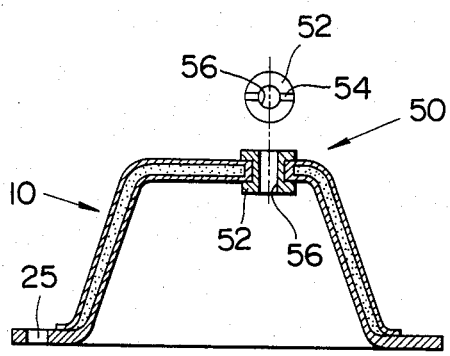
FIG. 6 is a vertical sectional view similar to FIGS. 2 and 5 showing an alternative structural reinforced access opening.

An alternative structural reinforced access opening 50 is shown in FIG. 6. This embodiment comprises an access opening body portion 52 of a suitable structural material as metal or hard plastic. The body portion 52 includes a cam-type locking device receiving channel 54, providing the female part of a cam-lock for receiving mating cam-lock pins of a plug to be described hereinbelow. The body portion 52 also includes a cylindrical access opening 56 for receiving the access plug. As best shown in FIG. 6, this alternative access opening body portion 52 is formed with the noise reducing cover 10 when the cover body portion 16, inside layer 18, and outside layer 20 are thermo-pressure bonded together to form the noise reducing cover of the present invention.

Figure 7A:
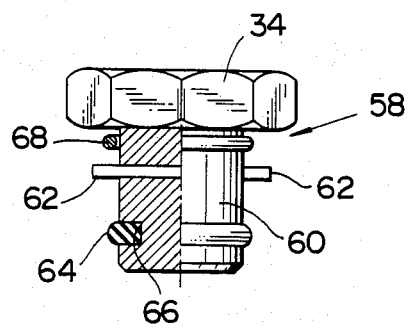
FIG. 7(A) is a view, shown in partial vertical section, of an alternative access opening plug for use with the embodiment of FIG. 6.
Figure 7B:
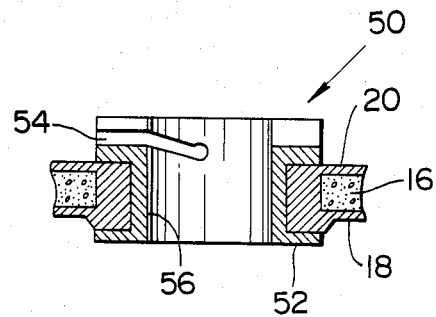
FIG. 7(B) is a vertical sectional view of the alternative structural reinforced access opening of FIG. 6.

An alternative access opening plug 58 is shown in FIG. 7(A) and comprises a shaft 60, a pair of opposing cam-lock pins 62 mounting therein and a plug head 34, as in the embodiment shown in FIG. 3. The plug shaft 60 engages the access opening 56 of the alternative embodiment access opening body portion 52, and the cam-lock pins 62 engage the mating cam-type locking device receiving channels 54 (see FIG. 7(B)) to "cam-lock" the plug 58 in position. This access plug 58 includes an O-ring gasket 64 disposed within an O-ring groove 66 in the plug shaft 60 for effecting an oil-tight seal between the plug shaft and the access opening inner surface 56. Additionally, a second O-ring 68 is provided at the upper section of the plug shaft 60 to insure an oil-tight seal. As best shown in FIG. 7(B), the cam-lock pins 62 engage mating cam-type locking device receiving channels 54. Therefore, rotating this alternative access opening plug 58 clockwise approximately 40 degrees will "lock" the plug in place, insuring an oil-tight seal.

Figure 8:
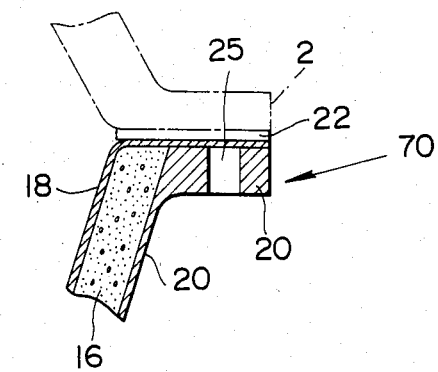
FIG. 8 is a vertical sectional view of an alternative mounting structure of the noise reducing cover of the present invention.

An alternative mounting structure 70 is shown in FIG. 8 and comprises a structural reinforcement portion constructed entirely of the second vibration and sound absorbing material, fiberglass in the embodiment, for added strength at the location of the various mounting holes 25. Although the first inner layer 18 and the second outer layer 20 are two initially separate pieces, thermo-pressure bonding of these pieces to the main body portion 16 also results in these two outside layers being joined together to form a single mounting structure exhibiting additional strength around the mounting holes.

Figure 9:
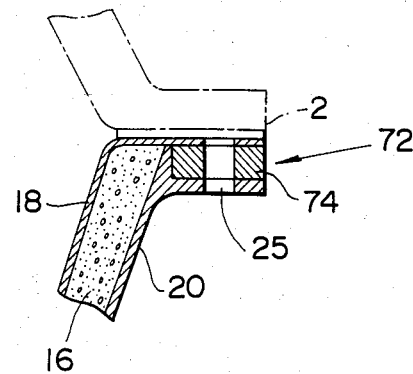
FIG. 9 is a vertical sectional view similar to FIG. 8 of a second alternative mounting structure of the noise reducing cover of the present invention.

A second alternative mounting structure 72 is shown in FIG. 9. In addition to the outer fiberglass layers 18 and 20, this second mounting structure 72 includes a structural reinforcement insert 74 of metal or strong plastic to further increase the strength and structural rigidity of the noise reducing cover of the present invention in the area of the mounting holes 25.

Those skilled in the art will readily appreciate that the noise reducing cover of the present invention exhibits vibration and sound damping and absorbing characteristics unattainable by conventional metal cylinder head covers and oil pans. Additionally, because it is constructed of a foamed polyurethane resin and fiberglass, the noise reducing cover of the present invention is considerably lighter in weight and more structurally sound than its all-metal counterpart. It will also be appreciated that, due to its construction, the noise reducing cover of the present invention exhibits heat transfer and heat dissipating characteristics far superior to those exhibited by all-metal cylinder head covers and oil pans.

The preferred embodiment of the present invention has been described as being constructed of a foam polyurethane body portion 16, having resin impregnated fiberglass outer layers thermo-pressure bonded thereto to form the cover of the present invention. Of course, comparable materials may be used for the body portion 16, typically a foam plastic such as a foam polyethylene or a foam rubber, while the outer layers 18 and 20 may be formed of a rubber material such as NBR, polypropylene plastic or a non-foam polyurethane material. Otherwise, the body portion 16 may be formed of a porous metal material such as foam metal or non-woven metal fabric, while the outside layers 18, 20 are formed of a plastic material such as polypropylene, or a rubber material such as NBR or AR.

Figure 10:
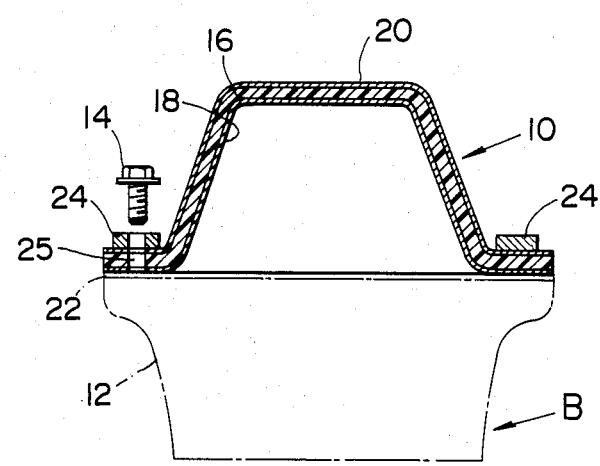
FIG. 10 is a vertical sectional view of a further embodiment of the noise reducing cover of the present invention.

FIG. 10 shows the construction of a further embodiment of the noise reducing cover according to the present invention, which cover comprises the main body portion 16 formed of the first vibration and sound absorbing material. In this embodiment, this first material is a foam polyurethane. The noise reducing cover 10 comprises the first inside layer 18 of the second vibration and sound absorbing material, integral with the main body portion 16. In this embodiment, this second material is an integral skin made of non-foam polyurethane. It is to be noted that the non-foam polyurethane skin 18 is impervious to engine oil so as to prevent oil from penetrating therethrough.

As shown, the noise reducing cover 10 also includes a second outside layer 20 of the second vibration and sound absorbing material integral with the main body portion 16 in the same manner as the first inside layer 18. It will be understood that the noise reducing cover formed of an integral composite of the first and second vibration and sound absorbing materials is formed into a self supporting three dimensional shape, in which the integral composite 16, 18, 20 is rigid enough to maintain a required shape of the noise reducing cover but soft or resilient enough to effectively absorb vibration and sound. As shown, the noise reducing cover 10 is not provided with any rigid layer made of a hard material such as metal or hard plastic. Accordingly, even when vibration is transmitted to the noise reducing cover 10 from an engine, the noise reducing cover effectively absorbs the vibration, and consequently the cover itself does not vibrate, thus preventing generation of noise form the surface of the noise reducing cover 10 so as not to create a secondary noise source. In this connection, the Shore hardness HsD (according to ASTM D-1484-59T) of the composite 16, 18, 20 is preferably within a range of lower than 70, and more preferably within a range of higher than 60 and lower than 70. If the Shore hardness of the composite is not higher than 60, the required shape of the noise reducing cover cannot be effectively kept in cases where any structural reinforcing material such as the mesh material is used in the noise reducing cover.

The significant advantages gained by virtue of the above-mentioned ranges of the hardness of the noise reducing cover composite 16, 18, 20 will be discussed with reference to the experimental data of FIGS. 11 and 12. The experimental data were obtained by experiments conducted by the inventor using a four-cylinder type automotive internal combustion engine (having a displacement of 1800 cc) which is provided with a sample rocker cover or cylinder head cover (as the noise reducing cover) mounted on the cylinder head thereof. In the experiments, the engine was operated under conditions of an engine speed of 4000 rpm, full throttle, and a spark timing of minimum advance for the best torque. In order to measure sound pressure level dB(A) using a microphone disposed near the central portion of the sample rocker cover, the engine was located in an anechoic chamber. In order to measure vibrational acceleration level dB(A), an accelerometer disposed at the central portion of the sample rocker cover was used.

Figure 11:
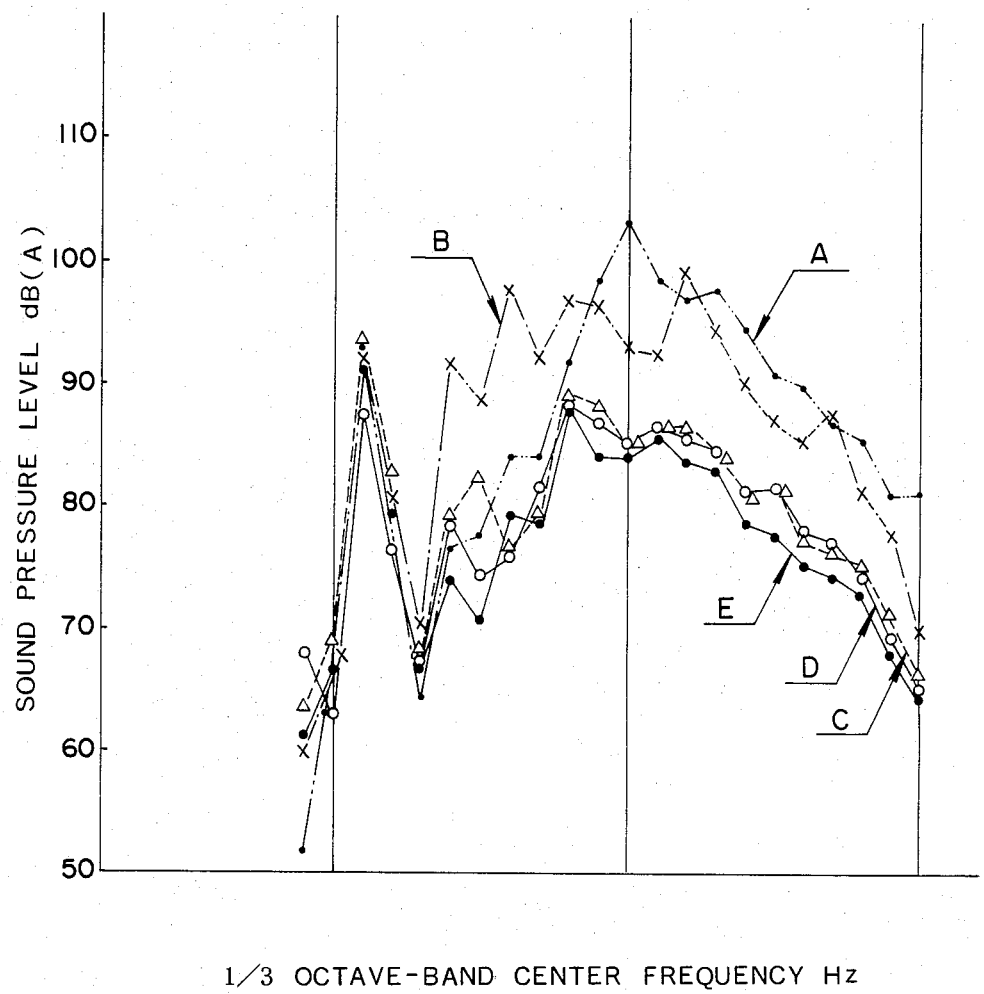
FIG. 11 is a graph showing the noise reduction effect of various materials of the noise reducing cover in terms of sound pressure level.
Figure 12:
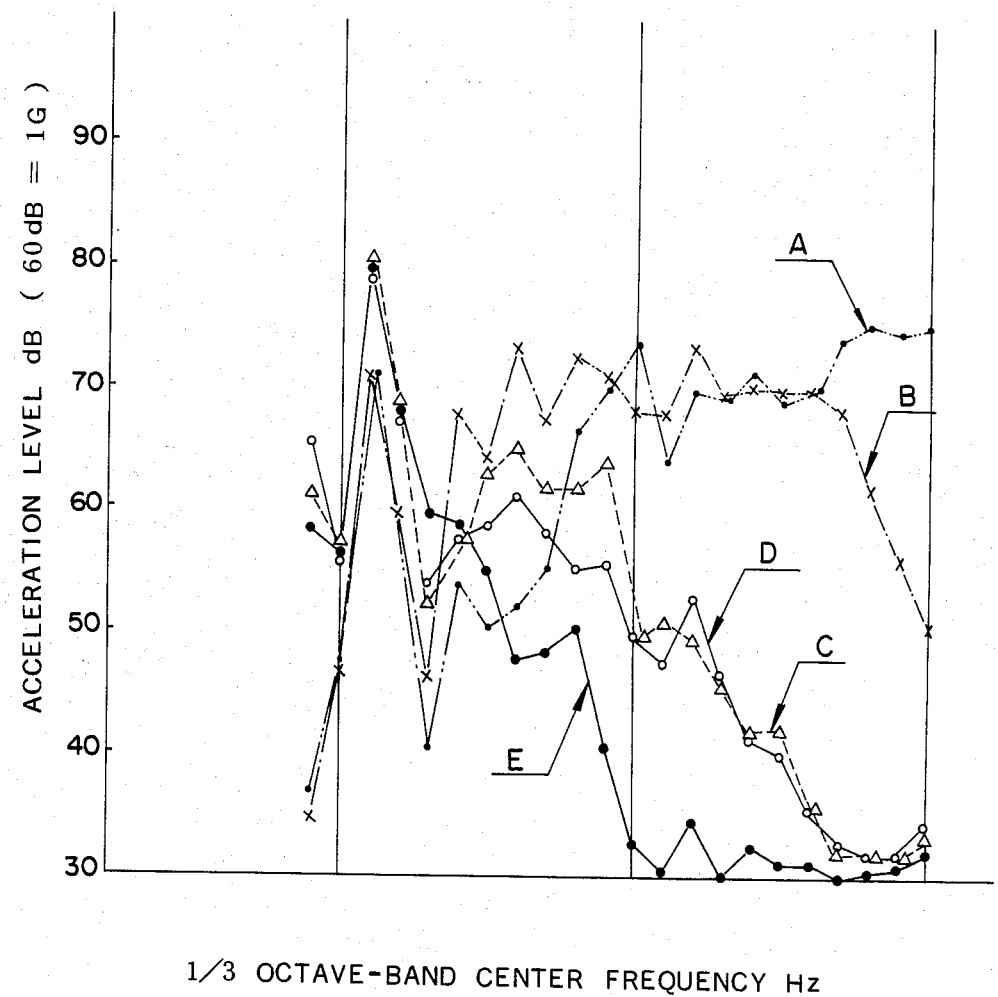
FIG. 12 is a graph showing the noise reduction effect of the various materials of the noise reducing cover in terms of vibrational acceleration level.

FIGS. 11 and 12 depict comparison in sound pressure level and comparison in vibrational acceleration level, respectively, among various sample rocker covers. In FIGS. 11 and 12, lines A, B, C, D, E indicate the experimental data of the sample rocker covers A, B, C, D, E, respectively. The sample rocker cover A was made of aluminum alloy. The sample rocker cover B was made of hard foam polyurethane having a Shore hardness HsD of 90. The sample rocker cover C was made of first semihard foam polyurethane having a Shore hardness HsD of 68. The sample rocker cover D was made of a second semihard foam polyurethane having a Shore hardness HsD of 65. The sample rocker cover E was made of a soft foam polyurethane having a Shore hardness HsD of 60. For reference, the soft and semihard foam polyurethanes were not higher than 3 (generally 2 to 3) in the number of functional groups per one molecule, while the hard foam polyurethane was not lower than 4 (generally 5 to 8) in the number of functional groups per one molecule.

The graphs of FIGS. 11 and 12 reveal that the sample rocker covers C, D and E resulted in both considerably lower sound pressure level and acceleration level compared to the sample rocker covers A and B. This means that rocker covers made of a material having a Shore hardness (HsD) lower than 70 are highly excellent in noise reduction effect as compared with rocker covers made of a material having a Shore hardness (HsD) not lower than 70. It will be seen that such noise reduction effect of the rocker covers made of material having a Shore hardness lower than 70 is particularly conspicuous within medium and high frequency ranges of vibration.

While the significant advantages of the above-mentioned range of hardness of the noise reducing cover material have been explained on the embodiment of the noise reducing cover formed of the composite material of foam polyurethane and non-foam polyurethane, it will be appreciated that the same significant advantages may be gained by noise reducing covers which are made of other materials, in which the main body portion 16 is formed of other foam plastic material such as foam polyethylene or a foam rubber while the inside and outside layers 18, 20 are formed of a rubber material such as NBR or polypropylene plastic. Furthermore, it will be understood that even if the noise reducing cover 10 is not provided with outside layer 20, the above-mentioned significant advantages may be obtained while maintaining the oil-imperviousness of the noise reducing cover 10.

It is to be noted that the principle of the present invention, particularly the above-mentioned critical range of hardness of the noise reducing cover, has been envisaged upon observation of actual noise generation and radiation mechanism in which the major source of overall noise radiated from the surface of the noise reducing cover is noise generated by vibration of the noise reducing cover itself. Noise generated inside and passing through the noise reducing cover is much less in contribution to the overall noise radiated from the noise reducing cover surface. This noise generation and radiation mechanism as confirmed by the inventor is shown in FIG. 13.

Figure 13:
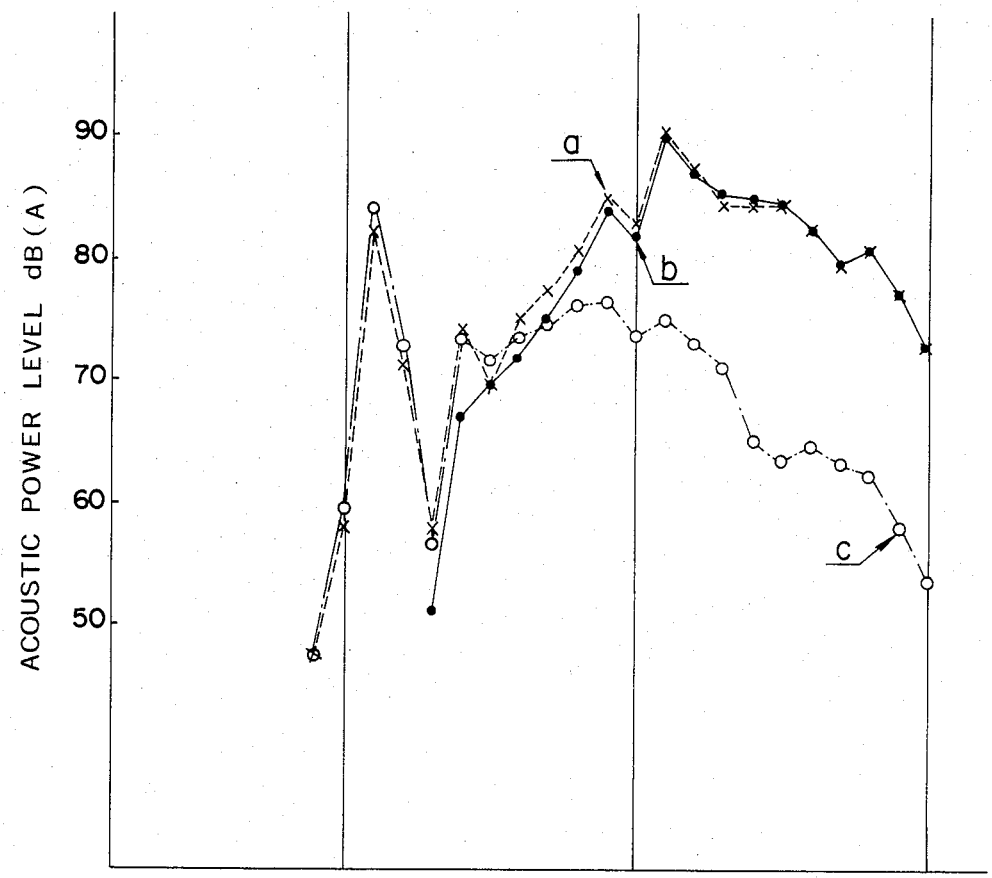
FIG. 13 is a graph illustrating the noise generation and radiation mechanism in connection with noise reducing covers, in terms of acoustic power level.

In FIG. 13, a line a indicates the overall acoustic power level of noise radiated from the surface of a rocker cover or cylinder head cover made of aluminum alloy. A line b indicates the acoustic power level of only noise generated by vibration of the rocker cover itself. A line c indicates the acoustic power level of noise generated inside the rocker cover and passing through the same cover. The experimental data of FIG. 13 were obtained by tests conducted under the same conditions as in those in FIG. 11.

As seen from FIG. 13, the overall noise radiated from the rocker cover or noise reducing cover can be sharply reduced by suppressing the noise radiation from the noise reducing cover surface, i.e., suppressing vibration of the noise reducing cover itself. In view of this fact, according to the present invention, the noise reducing cover is constructed of a relatively soft or resilient material which can effectively absorb the vibration applied thereto, and therefore the noise reducing cover is prevented from vibrating even upon receiving the vibration from the engine. It will be appreciated from the above, that the significant advantages of the present invention mainly depend on the fact that the noise reducing cover excludes a hard layer made of a material such as metal or hard plastic. In this regard, if a noise reducing cover includes a hard layer made of metal or hard plastic, the noise reducing cover will be largely vibrated when engine vibration is transmitted thereto, thus radiating considerable noise from the surface of the cover. Thus, the noise reducing cover rather acts as a secondary noise source.

Figure 14:
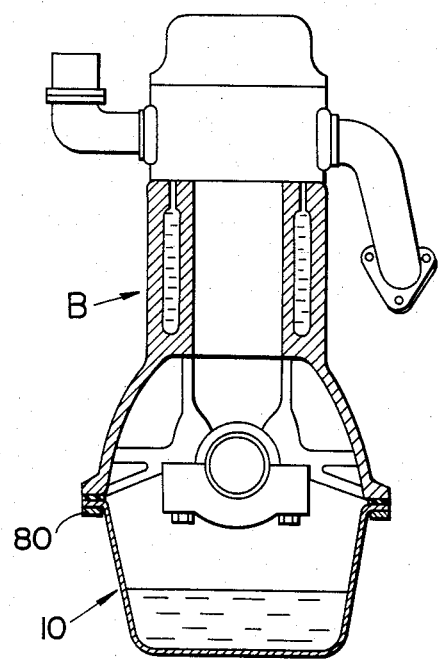
FIGS. 14 to 16 show a still further embodiment of the noise reducing cover of the present invention.
Figure 16:
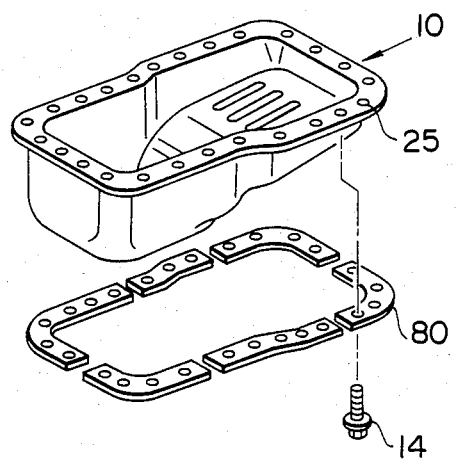
Figure 15:
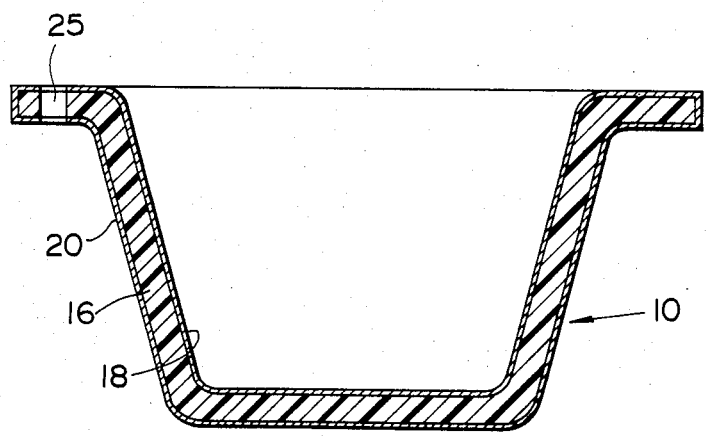

While the preferred embodiment of the present invention has been described in terms of an internal combustion engine cylinder head cover, it will readily be appreciated by those skilled in the art that a cover constructed according to the present invention possesses structural and thermal characteristics which make it ideally suited for use as an engine oil pan as well, as shown in FIGS. 14 to 16 in which the oil pan (noise reducing cover) 10 is installed to a cylinder block B by means of retainer members 80 made of plastic or metal. With respect to this oil pan, arrangements and constructions similar to those shown in FIGS. 6 to 9 may be applied.

There has been provided a noise reducing cover for use with an internal combustion engine in accordance with the present invention that satisfies all of the aims and objectives set forth hereinabove. It should be understood that further modifications and variations may be made in the present invention as described hereinabove without departing from the spirit of the present invention as set forth in the appended claims.

What is claimed is:

1. A noise reducing cover for an internal combustion engine, comprising:
    a body portion formed into a self supporting three dimensional shape of a first vibration and sound absorbing porous material;
    an inner layer formed of a second vibration and sound absorbing material, securely connected to the inner side of said body portion to form a composite, the inner layer being adapted to be directly connected to a surface of the engine and impervious to liquids; and
    wherein the Shore hardness (HsD) of said composite is lower than 70.

2. A noise reducing cover as claimed in claim 1, wherein said Shore hardness (HsD) of said composite is within a range of higher than 60 and lower than 70.

3. A noise reducing cover for an internal combustion engine, comprising:
    a body portion formed into a self supporting three dimensional shape of a first vibration and sound absorbing porous material;
    an inner layer formed of a second vibration and sound absorbing material, securely connected to the inner side of said body portion to form a composite of said first and second vibration and sound absorbing porous materials, said inner layer directly connected to a surface of the engine at a location at which said inner layer is exposed to oil used to lubricate the engine, said second vibration and sound absorbing material being impervious to said oil; and
    wherein the Shore hardness (HsD) of said composite is within a range of lower than 70.

4. A noise reducing cover as claimed in claim 3, wherein said means maintains the Shore hardness (HsD) of said composite within a range of higher than 60 and lower than 70.

5. A noise reducing cover as claimed in claim 3, further comprising an outer layer formed of said second vibration and sound absorbing material, securely connected to the outer side of said body portion.

6. A noise reducing cover as claimed in claim 3, wherein said first vibration and sound absorbing porous material is a foam material of one selected from the group consisting of plastic and rubber.

7. A noise reducing cover as claimed in claim 1, wherein said second vibration and sound absorbing material is a non-metallic material of one selected from the group consisting of inorganic fiber impregnated with thermosetting resin, plastic and rubber.

8. A noise reducing cover as claimed in claim 3, wherein said first vibration and sound absorbing porous material is one selected from the group consisting of foam polyurethane, foam polyurethane containing thermosetting resin, foam polyethylene, and foam rubber, foam metal, and non-woven metal fabric.

9. A noise reducing cover as claimed in claim 3, wherein said second vibration and sound absorbing material is one selected from the group consisting of non-foam polyurethane, fiberglass material impregnated with a thermosetting resin, rubber material, and polypropylene.

10. The noise reducing cover as claimed in claim 3, further comprising a section of structural reinforcement 112 material formed therewith, said reinforcement material including a mounting opening therein.

11. The noise reducing cover as claimed in claim 10, further comprising a second section of structural reinforcement material formed therewith, said second section including an access opening therein.

12. The noise reducing cover as claimed in claim 11, wherein said access opening includes a section of female threads for receiving a mating access opening plug.

13. The noise reducing cover as claimed in claim 11, wherein said access opening includes a cam-type lock device for receiving a mating access opening plug.

14. The noise reducing cover as claimed in claim 10, wherein said structural reinforcement material is said second vibration and sound absorbing material.

15. The noise reducing cover as claimed in claim 10, wherein said structural reinforcement material is metal, plastic or the like.

16. The noise reducing cover as claimed in claim 12, further comprising a plurality of structural reinforcing ridges formed with said first layer of said second vibration and sound absorbing material.

17. The noise reducing cover as claimed in claim 16, further comprising a structural reinforcing mesh material formed within said cover body portion.

18. The noise reducing cover as claimed in claim 17, wherein said first vibration and sound absorbing material comprises a foam polyurethane resin, and wherein said second vibration and sound absorbing material comprises a glass fiber material.

19. The noise reducing cover as claimed in claim 17, wherein said first vibration and sound absorbing material comprises a foam rubber material, and wherein said second vibration and sound absorbing material comprises a solid thermoplastic resin.

20. The noise reducing cover as claimed in claim 14, wherein said first vibration and sound absorbing material comprises a foam polyurethane resin, and wherein said second vibration and sound absorbing material comprises a glass fiber material.

21. The noise reducing cover as claimed in claim 4, wherein said structural reinforcement material is said second vibration and sound absorbing material.

22. The noise reducing cover as claimed in claim 14, wherein said structural reinforcement material is metal, plastic or the like.

23. The noise reducing cover as claimed in claim 6, further comprising a plurality of structural reinforcing ridges formed with said first layer of said second vibration and sound absorbing material.

* * * * *